(12) United States Patent
Feigenblat et al.

(10) Patent No.: US 10,831,806 B2
(45) Date of Patent: Nov. 10, 2020

(54) QUERY-BASED EXTRACTIVE SUMMARIZATION

(71) Applicant: International Business Machines Corporation, Armonk, NY (US)

(72) Inventors: Guy Feigenblat, Givatayim (IL); David Konopnicki, Haifa (IL); Haggai Roitman, Yokneam Elit (IL)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 16/173,038

(22) Filed: Oct. 29, 2018

(65) Prior Publication Data
US 2020/0134091 A1 Apr. 30, 2020

(51) Int. Cl.
*G06F 16/34* (2019.01)
*G06F 16/93* (2019.01)
*G06F 16/338* (2019.01)
*G06F 16/33* (2019.01)

(52) U.S. Cl.
CPC .......... *G06F 16/345* (2019.01); *G06F 16/338* (2019.01); *G06F 16/3334* (2019.01); *G06F 16/93* (2019.01)

(58) Field of Classification Search
CPC .... G06F 16/345; G06F 16/93; G06F 16/3334; G06F 16/338
USPC ........................................................ 715/254
See application file for complete search history.

(56) References Cited

U.S. PATENT DOCUMENTS

| 10,019,525 B1* | 7/2018 | Boni ................... G06F 16/9038 |
| 2002/0052901 A1* | 5/2002 | Guo ....................... G06F 16/345 |
| | | 715/247 |
| 2016/0283593 A1* | 9/2016 | Zhou ..................... G06F 16/951 |

FOREIGN PATENT DOCUMENTS

CN 106997387 8/2017

OTHER PUBLICATIONS

Zhong, Sheng-hua et al; "Query-oriented unsupervised multi-document summarization via deep learning model"; Expert Systems with Applications vol. 42 Issue 21; Nov. 30, 2015, pp. 8146-8155 (Year: 2015).*
Mehdad, Yashar et al. "Extractive Summarization under Strict Length Constraints." LREC (2016). (Year: 2016).*
(Continued)

*Primary Examiner* — Stephen S Hong
*Assistant Examiner* — Broderick C Anderson
(74) *Attorney, Agent, or Firm* — Dvir Gassner

(57) ABSTRACT

A system comprising at least one hardware processor; and a non-transitory computer-readable storage medium having stored thereon program instructions executable to receive, as input, one or more digital documents, a query statement, and a summary length constraint, automatically generate, for each of said one or more digital documents, an initial summary based, at least in part, on a first sentence selection which satisfies said query statement, a modified said summary length constraint, and a first summary quality goal, automatically extract, from each of said initial summaries, one or more associated feedback metrics, and automatically generate, for each of said one or more digital documents, a final summary based, at least in part, on: (i) a second sentence selection which satisfies said query statement, said summary length constraint, and a second summary quality goal, and (ii) at least one of said associated feedback metrics.

18 Claims, 5 Drawing Sheets

(56) References Cited

OTHER PUBLICATIONS

Guy Feigenblat et al. 2017. Unsupervised query-focused multi-document summarization using the cross entropy method. In Proceedings of the 40th International ACM SIGIR Conference on Research and Development in Information Retrieval. ACM, New York, NY, USA, SIGIR '17, pp. 961-964. (Year: 2017).*
Alguliyev et al. (2011). MCMR: Maximum coverage and minimum redundant text summarization model. Expert Systems with Applications. 38. 14514-14522. 10.1016/j.eswa.2011.05.033. (Year: 2011).*
L. Huang, Y. He, F. Wei and W. Li, "Modeling Document Summarization as Multi-objective Optimization," 2010 Third International Symposium on Intelligent Information Technology and Security Informatics, Jinggangshan, 2010, pp. 382-386. (Year: 2010).*
Guy Feigenblat et al., "Unsupervised )ery-Focused Multi-Document Summarization using the Cross Entropy Method", SIGIR'17, Aug. 7-11, 2017, pp. 961-964, Shinjuku, Tokyo, Japan.
Mahak Gambhir et al., "Recent automatic text summarization techniques: a survey", Artificial Intelligence Review, Jan. 2017, vol. 47, Issue 1, pp. 1-66.
Li et al., "Cascaded Attention based Unsupervised Information Distillation for Compressive Summarization", Proceedings of the 2017 Conference on Empirical Methods in Natural Language Processing, Sep. 7-11, 2017, pp. 2081-2090, Copenhagen, Denmark.
Li et al., "Salience estimation via variational auto-encoders for multidocument summarization", Proceedings of the Thirty-First AAAI Conference on Artificial Intelligence (AAAI-17), pp. 3497-3503.
Shashi Narayan et al., "Ranking sentences for extractive summarization with reinforcement learning", Proceedings of NAACL-HLT 2018, pp. 1747-1759.
You Ouyang et al., "Applying regression models to query-focused multi-document summarization", Information Processing & Management, Mar. 2011, vol. 47, Issue 2, pp. 227-237.
Romain Paulus et al., "A Deep Reinforced Model for Abstractive Summarization", ICLR 2018, 2018.
Pengjie Ren et al., "Leveraging Contextual Sentence Relations for Extractive Summarization Using a Neural Attention Model", Proceedings of the 40th International ACM SIGIR Conference on Research and Development in Information Retrieval, 2017, pp. 95-104.
Ziqiang Cao et al., "AttSum: Joint Learning of Focusing and Summarization with Neural Attention", Proceedings of COLING 2016, the 26th International Conference on Computational Linguistics: Technical Papers, Dec. 11-17, 2016, pp. 547-556, Osaka, Japan.
Tal Baumel et al., "Query Focused Abstractive Summarization: Incorporating Query Relevance, Multi-Document Coverage, and Summary Length Constraints into seq2seq Models", arXiv:1801.07704, Jan. 2018.

\* cited by examiner

US 10,831,806 B2

QUERY-BASED EXTRACTIVE SUMMARIZATION

BACKGROUND

The invention relates to the field of automated language processing.

The vast amounts of textual data end users need to consume motivates the need for automatic summarization of text. An automatic summarizer gets as an input one or more documents and possibly also a limit on summary length (e.g., maximum number of words). The summarizer then produces a textual summary that captures the most salient (general and informative) content parts within the input documents. Oftentimes, the summarizer may also be required to satisfy a specific information need from a user, expressed by one or more queries (e.g., summarization of web search results). Therefore, the summarization task comprises producing a summary that is both focused and includes the most relevant information.

The foregoing examples of the related art and limitations related therewith are intended to be illustrative and not exclusive. Other limitations of the related art will become apparent to those of skill in the art upon a reading of the specification and a study of the figures.

SUMMARY

The following embodiments and aspects thereof are described and illustrated in conjunction with systems, tools and methods which are meant to be exemplary and illustrative, not limiting in scope.

There is provided, in an embodiment, A system comprising at least one hardware processor; and a non-transitory computer-readable storage medium having stored thereon program instructions, the program instructions executable by the at least one hardware processor to: receive, as input, one or more digital documents, a query statement, and a summary length constraint, automatically generate, for each of said one or more digital documents, an initial summary based, at least in part, on a first sentence selection which satisfies said query statement, a modified said summary length constraint, and a first summary quality goal, automatically extract, from each of said initial summaries, one or more associated feedback metrics, and automatically generate, for each of said one or more digital documents, a final summary based, at least in part, on: (i) a second sentence selection which satisfies said query statement, said summary length constraint, and a second summary quality goal, and (ii) at least one of said associated feedback metrics.

There is also provided, in an embodiment, a method comprising: operating at least one hardware processor for receiving, as input, one or more digital documents, a query statement, and a summary length constraint; automatically generating, for each of said one or more digital documents, an initial summary based, at least in part, on a first sentence selection which satisfies said query statement, a modified said summary length constraint, and a first summary quality goal; automatically extracting, from each of said initial summaries, one or more associated feedback metrics; and automatically generating, for each of said one or more digital documents, a final summary based, at least in part, on: (i) a second sentence selection which satisfies said query statement, said summary length constraint, and a second summary quality goal, and (ii) at least one of said associated feedback metrics.

There is further provided, in an embodiment, a computer program product comprising a non-transitory computer-readable storage medium having program instructions embodied therewith, the program instructions executable by at least one hardware processor to: receive, as input, one or more digital documents, a query statement, and a summary length constraint, automatically generate, for each of said one or more digital documents, an initial summary based, at least in part, on a first sentence selection which satisfies said query statement, a modified said summary length constraint, and a first summary quality goal, automatically extract, from each of said initial summaries, one or more associated feedback metrics, and automatically generate, for each of said one or more digital documents, a final summary based, at least in part, on: (i) a second sentence selection which satisfies said query statement, said summary length constraint, and a second summary quality goal, and (ii) at least one of said associated feedback metrics.

In some embodiments, said one or more associated feedback metrics are selected from the group consisting of: frequency of unique textual aspects, distribution of unique textual aspects, patterns of unique textual aspects, relative start-positions of sentences, maximum sentence length, minimum sentence length, average sentence length, maximum number of words in each sentence, minimum number of words in each sentence, and average number of words in each sentence.

In some embodiments, said unique textual aspects comprise at least one of n-grams, entities, and concepts.

In some embodiments, said first quality goals is summary saliency, and said second summary quality goal is summary focus.

In some embodiments, said first quality goal comprises a plurality of quality goals selected from the group consisting of: document coverage, sentence position bias, summary length, asymmetric coverage, and focus drift.

In some embodiments, said second quality goal comprises a query-relevancy quality goal.

In some embodiments, said first and second sentence selections are each based, at least in part, on solving an optimization problem using one or more specified optimization frameworks.

In some embodiments, said optimization framework is a cross-entropy framework.

In some embodiments, said modified summary length constraint is an adaptive summary length constraint, based, at least in part, on importance sampling.

In addition to the exemplary aspects and embodiments described above, further aspects and embodiments will become apparent by reference to the figures and by study of the following detailed description.

BRIEF DESCRIPTION OF THE FIGURES

Exemplary embodiments are illustrated in referenced figures. Dimensions of components and features shown in the figures are generally chosen for convenience and clarity of presentation and are not necessarily shown to scale. The figures are listed below.

DETAILED DESCRIPTION

Disclosed herein are a system, method, and computer program product for automated extractive-based unsupervised text summarization.

Within the field of natural language processing (NLP), text summarization is often referred to as the task of extracting fragments of text from a corpus, which condenses the corpus to a shorter length while retaining the crux of the corpus. Various methods of summarization currently exist that can be categorized into two main frameworks: extractive vs. abstractive and supervised vs. unsupervised. Extractive-based summarization relates to extracting objects from a corpus without modification. For example, whole sentences may be removed from a document without modification to create a short summary of the document. Abstraction-based summarization relates to paraphrasing sections of a document to produce a document summary.

Supervised summarization relates to using a model and training data to select the most appropriate text fragments to include within a summary. Conversely, unsupervised summarization relies on an algorithm to identify and select the text fragments to include in a summary rather than relying on a large amount of training data. Supervised methods typically require more domain knowledge than unsupervised summarization methods.

In the task of text summarization, although both saliency and focus should be considered within a query-focused summarization setting, these goals may be actually conflicting with each other (Carbonell and Goldstein 1998). Thus, higher saliency usually comes at the expense of lower focus and visa-versa. Moreover, the tradeoff between saliency and focus may directly depend on summary length. See Carbonell, J., and Goldstein, J. 1998. "The use of MMR, diversity-based reranking for reordering documents and producing summaries." In Proceedings of the 21st Annual International ACM SIGIR Conference on Research and Development in Information Retrieval, SIGIR '98, 335-336. New York, N.Y., USA: ACM.

Figure 1:
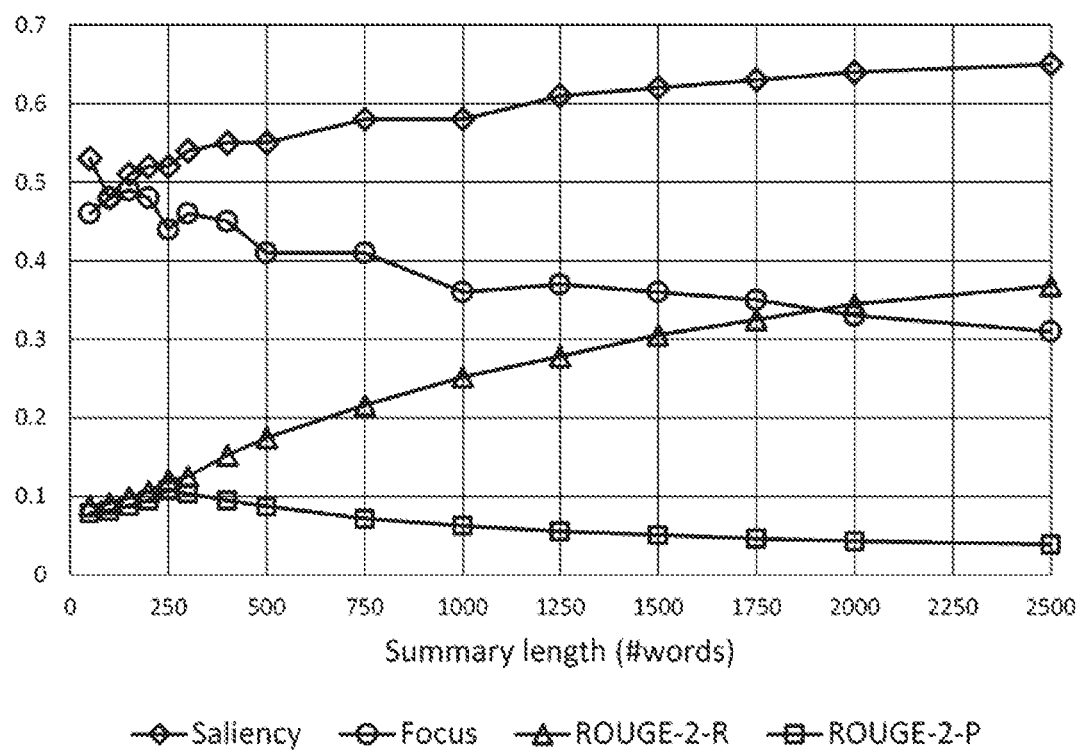
FIG. 1 illustrates the tradeoff between summary saliency and focus goals using varying summary lengths.

FIG. 1 illustrates the tradeoff between summary saliency and focus goals using varying summary length upper bounds. The results show summarization quality which was obtained by the Cross Entropy Summarizer (CES), an unsupervised query-focused multi-document extractive summarizer (Feigenblat et al. 2017). The summarization quality was measured by ROUGE-2 (Lin 2004) Precision (ROUGE-2-P) and Recall (ROUGE-2-R), and is reported for increasing upper bound limits set on produced summary length (in words). Saliency was measured according to cosine similarity between the summary's bigram representation and that of input documents. Focus was further measured relatively to how much the summary's induced unigram model is "concentrated" around query-related words. See, Feigenblat, G.; Roitman, H.; Boni, O.; and Konopnicki, D. 2017. "Unsupervised query-focused multi-document summarization using the cross entropy method." In Proceedings of the 37th International ACM SIGIR Conference on Research & Development in Information Retrieval, SIGIR '14. ACM; Lin, C.-Y. 2004. "Rouge: A package for automatic evaluation of summaries." In Text summarization branches out: Proceedings of the ACL-04 workshop, volume 8. Barcelona, Spain.

A closer examination of the results in FIG. 1 demonstrates that, with the relaxation of summary length limit, where a lengthier summary is being allowed, saliency increases at the expense of focus. Moreover, while saliency is strongly correlated with ROUGE-2-R, focus is strongly correlated with ROUGE-2-P. Laying towards more saliency would result in a better coverage of general and more informative content, leading to higher recall. Yet, this would reduce precision, where less relevant content would be included.

Accordingly, in some embodiments, a summarizer of the present invention may be configured for extractive-based unsupervised text summarization, while optimizing a tradeoff between saliency and focus quality goals in the produced summaries.

A potential advantage of the present invention is, therefore in that it provides for an unsupervised, query-focused, extractive multi-document summarizer configured for maximizing both saliency and focus, while providing improved summarization quality compared to known unsupervised as well as supervised methods.

In some embodiments, the present summarizer provides for optimizing the saliency versus focus tradeoff by employing an advantageous novel two-step dual-cascade optimization approach, which utilizes two sequential CES-like invocations. In some embodiments, both CES invocations may consider the same sentences powerset solution space, however, each invocation may utilize a different set of summary quality predictors, alternately consistent with higher summary saliency and higher summary or focus.

By way of background, the query-focused, multi-document summarization task may be described as follows: Let q denote some user information need for documents summarization, which may be expressed by one or more queries. Let D denote a set of one or more matching documents to be summarized, and $L_{max}$ be the maximum allowed summary length (in words). The goal of an extractive summarization approach is to produce a length-limited summary S by extracting salient content parts in D which are also relevant (focused) to q. The summarization task may first be cast as a sentence subset selection problem. To this end, a summary S may be produced (with maximum length $L_{max}$) by choosing a subset of sentences s∈D which maximizes a given quality target Q (S|q, D).

FIG. 1 is a block diagram of an exemplary system 200 for automated extractive-based unsupervised text summarization, according to an embodiment. System 200 may comprise one or more hardware processors 202, and a non-transitory computer-readable storage device 204. System 200 as described herein is only an exemplary embodiment of the present invention, and in practice may be implemented in hardware only, software only, or a combination of both hardware and software. System 200 may have more or fewer components and modules than shown, may combine two or more of the components, or may have a different configuration or arrangement of the components. In various embodiments, system 200 may comprise one or more dedicated hardware devices, one or more software modules, and/or may form an addition to or extension to an existing device.

Storage medium 204 may have encoded thereon software instructions or components configured to operate a processing unit (also "hardware processor," "CPU," or simply "processor"), such as hardware processor(s) 202. In some embodiments, the software components may include an operating system, including various software components and/or drivers for controlling and managing general system tasks (e.g., memory management, storage device control, power management, etc.), and facilitating communication between various hardware and software components. In some embodiments, the program instructions are segmented into one or more software modules, which may comprise, e.g., a predictor module 206.

Figure 2:
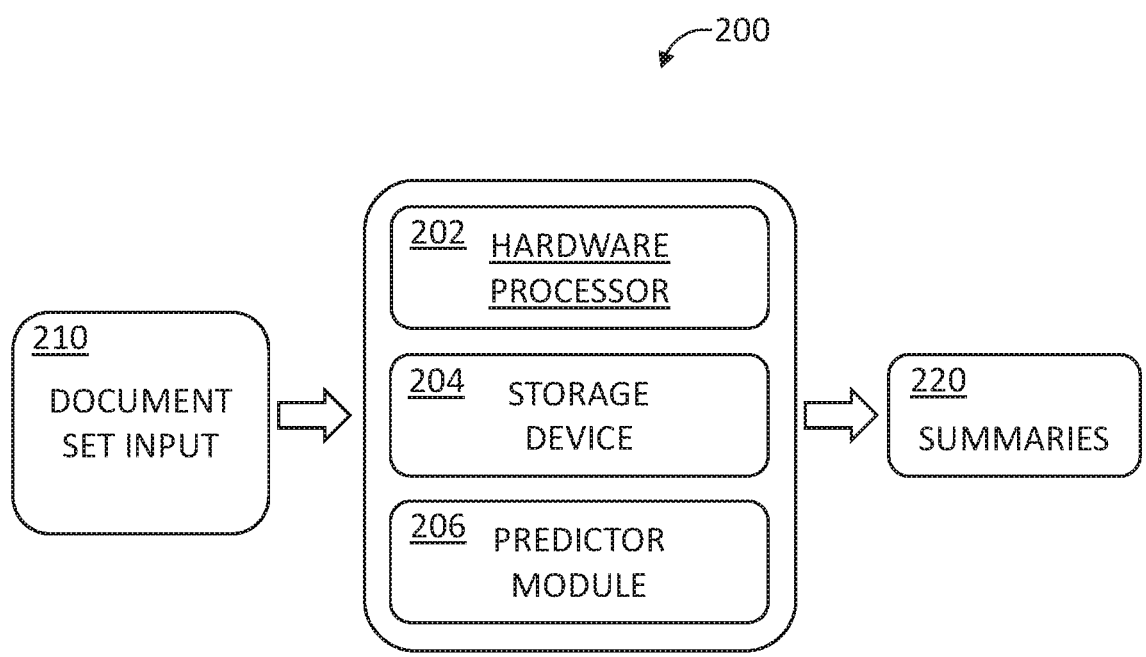
FIG. 2 is a block diagram of an exemplary system for automated extractive-based unsupervised text summarization, according to an embodiment.
Figure 3:
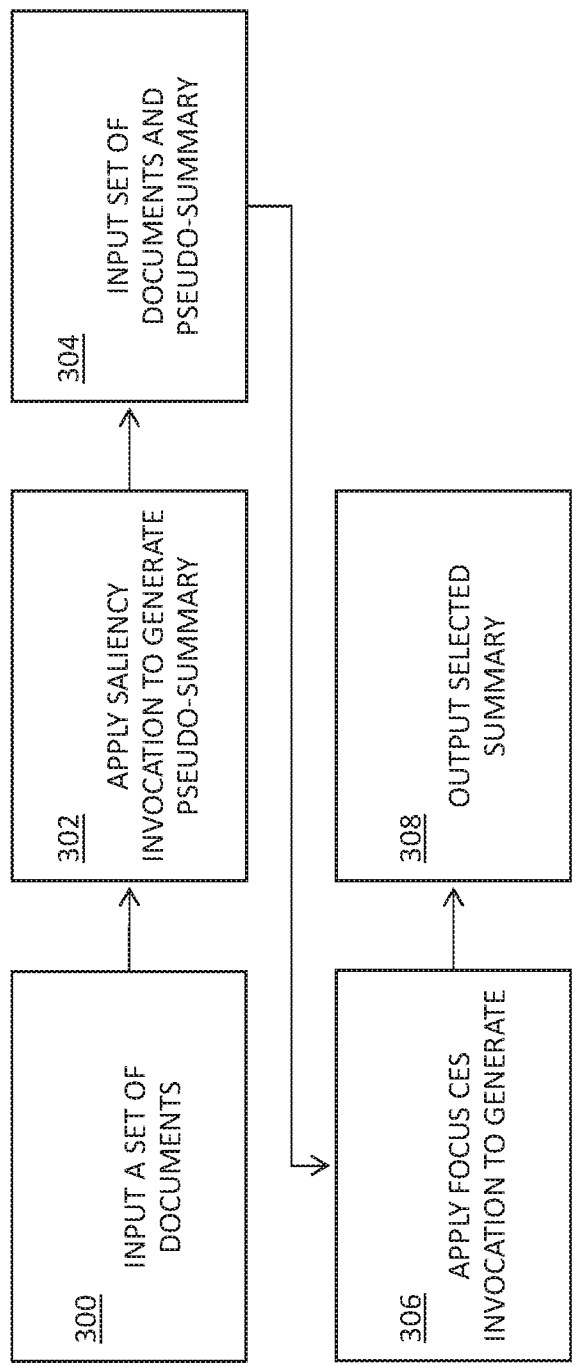
FIG. 3 is a flowchart illustrating the functional steps of a process for automated extractive-based unsupervised text summarization, according to an embodiment.

An overview of the functional steps in a process for automated extractive-based unsupervised text summarization will now be provided with continuing reference to FIG. 2 and the flowchart in FIG. 3.

As noted above, in some embodiments, the present summarizer may be configured for implementing a two-step dual-cascade optimization approach, which utilizes two invocations of a CES-like process. In some embodiments, both CES-like invocations may be configured for considering the same sentences powerset solution space, however, each of the invocations may utilize a different set of summary quality predictors $\hat{Q}_i(S|q, D)$, depending on whether the goal of the invocation is to maximize saliency or focus. In some embodiments, at a first CES-like invocation, the present summarizer may be configured for relaxing the summary length constraint, permitting a longer summary with greater saliency. In some embodiments, this initial summary may then be treated as a pseudo-effective reference summary from which one or more saliency-based feedback metrics are extracted. Such feedback metrics are then utilized as input in a second CES-like invocation of the cascade for setting an additional auxiliary saliency-driven goal. However, at the second invocation, the primary quality goal may be set to maximize focus (with a maximum length limit $L_{max}$). Overall, the present dual-step process may be described as follows:

$$\text{CEM}(\hat{Q}_{Foc}(\bullet|q,D),L_{max},\text{CEM}(\hat{Q}_{Sal}(\bullet|q,D),\overline{L},\emptyset)).$$

Here, $\hat{Q}_{Sal}(\bullet|q, D)$ and $\hat{Q}_{Foc}(\bullet|q, D)$ denote the saliency and focus summary quality objectives which are optimized respectively during the two-step cascade process. Both $\hat{Q}_{Sal}(\bullet|q, D)$ and $\hat{Q}_{Foc}(\bullet|q, D)$ are implemented as a product of several basic predictors. $\overline{L} \geq L_{max}$ denotes the relaxed summary length hyperparameter.

Figure 4:
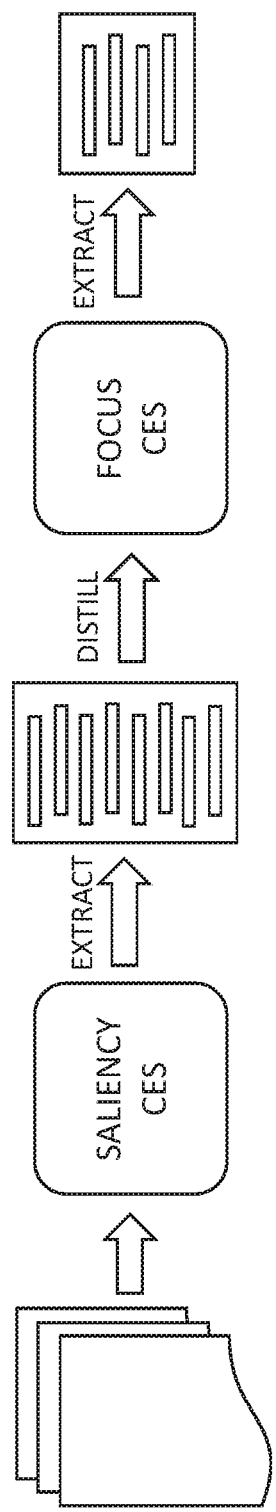
FIG. 4 schematically illustrates an implementation flow of a process for automated extractive-based unsupervised text summarization, according to an embodiment.

A detailed description of the two-step process will next be provided, with continued reference to FIG. 3 and to FIG. 4, which is a schematic illustration of the dual-step process of the present summarizer.

At a step 300, a set of document may be received by the summarizer as input.

At a step 302, in some embodiments, the present summarizer may employ a cross-entropy summarization (CES)-like method (Rubinstein and Kroese 2004) for selecting the most 'promising' subset of sentences. See, D. Rubinstein, R. Y., and Kroese, D. P. 2004; "The cross-entropy method: a unified approach to combinatorial optimization," Monte-Carlo simulation and machine learning; Springer.

By way of background, the cross entropy (CE) method provides a generic Monte-Carlo optimization framework for solving hard combinatorial problems. To this end, CE gets as an input, e.g., $\hat{Q}(\bullet|q, D)$, a constraint on maximum summary length L, and an optional pseudo-reference summary $S_L$ whose usage will be explained later on. Let $$\text{CEM}(\hat{Q}(\bullet|q,D),L,S_L)$$

denote a single invocation of the CE method. The result of such an invocation is a single length-feasible summary S* which contains a subset of sentences selected from D which maximizes $\hat{Q}(\bullet|q, D)$. For example, CES is implemented by invoking $$\text{CEM}(\hat{Q}_{CES}(\bullet|q,D),L_{max},\emptyset).$$

For a given sentence $s \in D$, let $\varphi(s)$ denote the likelihood that it should be included in summary S. Starting with a selection policy with the highest entropy (i.e., $\varphi_0(s)=0.5$), the CE method learns a selection policy $\varphi^*(\bullet)$ that maximizes $\hat{Q}(\bullet|q, D)$ To this end, $\varphi^*(\bullet)$ is incrementally learned using an importance sampling approach. At each iteration $t=1, 2, \ldots$, a sample of N sentence-subsets $S_j$ is generated according to the selection policy $\varphi_{t-1}(\bullet)$ which was learned in the previous iteration $t-1$. The likelihood of picking a sentence $s \in D$ at iteration t is estimated (via cross-entropy minimization) as follows:

$$\varphi_t(s) \stackrel{def}{=} \frac{\sum_{j=1}^{N} \delta_{[\hat{Q}(S_j|q,D) \geq \gamma_t]} \delta_{[s \in S_j]}}{\sum_{j=1}^{N} \delta_{[\hat{Q}(S_j|q,D) \geq \gamma_t]}}.$$

Here, $\delta_{[\bullet]}$ denotes the Kronecker-delta (indicator) function, and $\gamma_t$ denotes the $(1-\rho)$-quantile $(\rho \in (0, 1))$ of the sample performances $\hat{Q}(S_j|q, D)$ $(j=1, 2, \ldots, N)$. Therefore, the likelihood of picking a sentence $s \in D$ will increase when it is being included in more (subset) samples whose performance is above the current minimum required quality target value $\gamma_t$. In some embodiments, $\varphi_t(\bullet)$ may further be smoothed as follows:

$$\varphi_t(\bullet)' = \alpha \varphi_{t-1}(\bullet) + (1-\alpha)\varphi_t(\bullet),$$

with $\alpha \in [0, 1]$.

Upon its termination, the CE method is expected to converge to the global optimal selection policy $\varphi^*(\bullet)$. A single summary $S^* \sim \varphi^*(\bullet)$ may then be produced based on the convergence. To enforce that only feasible summaries will be produced, $\hat{Q}(S_j|q, D) = -\infty$ may be set whenever a sampled summary $S_j$ length exceeds the L word limit. Alternatively, the maximum length constraint may be directly enforced during sampling.

In some embodiments, because an unsupervised setting is assumed, no actual reference summaries are available for training. Similarly, actual quality target $Q(S|q, D)$ cannot be directly optimized. Instead, $Q(S|q, D)$ may be 'surrogated' by several summary quality prediction measures:

$$\hat{Q}_i(S|q,D)(i=1,2,\ldots,m).$$

Each such quality 'predictor' $\hat{Q}_i(S|q, D)$ is designed to estimate the level of saliency or focus of a given candidate summary S, and is presumed to correlate (up to some extent) with actual summarization quality, e.g., as may be measured by ROUGE. For simplicity, the several quality predictors are assumed to be independent of one another, and are combined into a single optimization objective by taking their product:

$$\hat{Q}(S|q,D) \stackrel{\triangle}{=} \Pi_{i=1}^{m} \hat{Q}_i(S|q,D).$$

Accordingly, at step 302, a saliency-based CES-like invocation may be applied, to produce a single initial pseudo-reference summary (with length $\overline{L} \geq L_{max}$) of each document, which will be used as an input for extracting one or more saliency-based feedback metrics. As illustrated in FIG. 1, a longer summary length typically may be correlated with increased saliency in the summary.

In some embodiments, step 302 may be implemented by invoking the CE method with CEM($\hat{Q}_{Sal}$(•|q, D), $\overline{L}$, Ø). The target measure $\hat{Q}_{Sal}$(•|q, D) guides the optimization towards the production of a summary with the highest possible saliency. Similar to CES, $\hat{Q}_{Sal}$(•|q, D) is calculated as the product of several summary quality predictors.

In some embodiments, the present summarizer may employ several different predictors, e.g., five different predictors. In some embodiments, the present summarizer may employ more or fewer predictors.

In some embodiments, a first predictor may be configured for maximizing coverage, e.g., by estimating to what extent a candidate summary S covers the document set D. Both S and D may be represented as term-frequency vectors, considering only bigrams, which commonly-represent more important content units. Accordingly, for a given text x, let $$\cos(S, x) \stackrel{def}{=} \frac{\vec{S} \cdot \vec{x}}{\|\vec{S}\|\|\vec{x}\|}.$$

The coverage predictor is then defined by $$\hat{Q}_{cov}(S|q,D) \stackrel{\Delta}{=} \cos(S,D).$$

In some embodiments, a second predictor may be a position-bias predictor, which biases sentence selection towards sentences that appear earlier in their containing documents. The position-bias predictor may be calculated as $$\hat{Q}_{pos}(S|q, D) \stackrel{def}{=} |S| \sqrt{\prod_{s \in S} \left(1 + \frac{1}{\log(b + pos(s))}\right)},$$

where pos(s) is the relative start position (in characters) of sentence s in its containing document and b is a position-bias hyperparameter (fixed to b=2).

In some embodiments, a third predictor may be a summary length predictor which biases towards selection of summaries that are closer to the maximum permitted length. Such summaries contain fewer and longer sentences, and therefore, tend to be more informative. Let len(x) denote the length of text x (in number of words). Here, x may either be a single sentence s∈D or a whole summary S. This predictor is then calculated as $$\hat{Q}_{len}(S|q, D) \stackrel{def}{=} \frac{1}{|S|} len(S),$$

where $len(S) = \Sigma_{s \in S}$ len(s).

In some embodiments, a fourth predictor may be an asymmetric coverage predictor, which biases towards higher saliency, as inspired by the risk minimization framework (see, Zhai, C., and Lafferty, J. 2006. A risk minimization framework for information retrieval. Inf. Process. Manage. 42(1):31-55). To this end, the Kullback-Leibler (KL) 'similarity' is measured between the two (unsmoothed) unigram language models induced from the centroid representation of S ($\hat{\theta}_S$) and D ($\hat{\theta}_D$), which may be given by concatenating the text of sentences in S or documents in D. This may be represented formally as:

$$\hat{Q}_{KL}(S|q, D) \stackrel{def}{=} \exp\left(-\sum_w p(w|\hat{\theta}_S) \log \frac{p(w|\hat{\theta}_S)}{p(w|\hat{\theta}_D)}\right).$$

In some embodiments, a fifth predictor may be a focus-drift predictor. Although longer summaries may result in higher saliency, they may also be less focused. Hence, to avoid such focus-drift, although the main goal is still saliency at this stage, the target information need q should be still considered. To this end, an additional predictor may be added, which acts as a 'query-anchor' and measures to what extent summary S's unigram model is devoted to the information need q, i.e:

$$\hat{Q}_{qf}(S|q,D) \stackrel{\Delta}{=} \Sigma_{w \in q} p(w|\hat{\theta}_S).$$

In some embodiments, at a step 304, the initial pseudo-summary generated in step 302 may be used as input, together with the initial set of documents and summary length constraint $L_{max}$, for a second, focus-based, CES-like invocation.

In some embodiments, a next step 306 may be implemented by invoking the CE method with CEM($\hat{Q}_{Foc}$(•|q, D), $L_{max}$, $S_{\overline{L}}$). Here, the target measure $\hat{Q}_{Foc}$(•|q, D) guides the optimization towards the production of a focused summary, while still keeping high saliency as much as possible. To achieve that, an additional focus-driven predictor may be used, which bias summary production towards higher focus. Moreover, using the pseudo-reference summary $S_L$ generated in step 302 introduces an additional auxiliary saliency-based predictor, whose goal is to enhance the saliency of the produced focus-based summary. Overall, $\hat{Q}_{Foc}$(•|q, D) may be calculated as the product of the previous five summary quality predictors of step 302, and two additional predictors whose details are described next.

In some embodiments, a sixth predictor may be a query-relevancy predictor which estimates the relevancy of summary S to query q. For this, two similarity measures may be used. The first similarity measure may determine the Bhattacharyya similarity (coefficient) between the two (unsmoothed) unigram language models of q and S:

$$\hat{Q}_{sim1}(S|q,D) \stackrel{\Delta}{=} \Sigma_{w \in q} \sqrt{p(w|\hat{\theta}_q) p(w|\hat{\theta}_S)}.$$

The second similarity measure may determine the cosine similarity between q and S unigram term-frequency representations, i.e.:

$$\hat{Q}_{sim2}(S|q,D) \stackrel{\Delta}{=} \cos(S,q).$$

The two similarity measures are then combined into a single measure using their geometric mean:

$$\hat{Q}_{sim}(S|q,D) \stackrel{\Delta}{=} \sqrt{\hat{Q}_{sim1}(S|q,D) \cdot \hat{Q}_{sim2}(S|q,D)}.$$

In some embodiments, a seventh predictor may be a reference summary (distillation) coverage predictor. In some embodiments, the pseudo-reference summary $S_{\overline{L}}$, generated in step 302, may be used for introducing one or more saliency-based feedback metrics into the second CE invocation. Such feedback metric may be, e.g., unique textual aspects extracted from $S_{\overline{L}}$, such as the frequency, distribution, and/or patterns of n-grams, entities and/or concepts, etc., in $S_{\overline{L}}$. This may be calculated as—

$$\hat{Q}_{cov}(S|q,D) \stackrel{\Delta}{=} \Sigma_{w \in S_{\overline{L}}} \delta_{[w \in S]}.$$

For example, in some embodiments, a specified number (e.g., 100) of the most frequently-occurring n-grams, entities, and/or concepts in $S_{\overline{L}}$ may be considered. In other embodiments, different numbers and/or ranges of numbers may be considered.

Intuitively speaking, pseudo-reference summary $S_{\overline{L}}$ usually will be longer (in words) than any candidate summary S that may be chosen in step 306; hence, $S_{\overline{L}}$ is expected to be more salient than S. Therefore, such feedback metrics extracted from $S_{\overline{L}}$ are expected to 'drive' the optimization process of the second CE invocation to prefer those candidate summaries S that include as many salient words from $S_{\overline{L}}$, acting as if they were by themselves longer (and more salient) summaries than those candidates that include fewer salient words from $S_{\overline{L}}$.

In some embodiments, other feedback metrics may be gleaned from pseudo-reference summary $S_{\overline{L}}$, which may potentially be selected to improve saliency. One such feedback metric may be the relative start-positions of sentences in $S_{\overline{L}}$. To this end, let $$\hat{\mu}_{pos}(S_{\overline{L}}) \stackrel{def}{=} \frac{1}{|S_{\overline{L}}|} \sum_{s \in S_{\overline{L}}} pos(s)$$

denote the average start-position of feedback sentences in $S_{\overline{L}}$. Then $b = \hat{\mu}_{pos}(S_{\overline{L}})$ is assigned as the value of the position-bias hyperparameter within $\hat{Q}_{pos}(S|q, D)$ from the position-bias predictor used in step 302.

In some embodiments, other and/or additional feedback metrics may include, e.g., maximum sentence length, minimum sentence length, average sentence length, maximum number of words in each sentence, minimum number of words in each sentence, and average number of words in each sentence.

Finally, at a step 308, a summary S may be selected which optimizes both saliency and focus.

In some embodiments, the present summarizer may be configured for adaptively adjusting the value of hyperparameter $\overline{L}$. To this end, a new learning parameter $L_t$ may be introduced, which defines the maximum length limit for summary production (sampling) that is allowed at iteration t of the CE method. The summary lengths may then be assumed to have a Poisson($L_t$) distribution of word occurrences with mean $L_t$. Using importance sampling, this parameter is estimated at iteration t as follows:

$$L_t \stackrel{def}{=} \frac{len(S_j) \cdot \delta_{[\hat{Q}(S_j|q,D) \geq \gamma_t]}}{\sum_{j=1}^{N} \delta_{[\hat{Q}(S_j|q,D) \geq \gamma_t]}}.$$

Similar to $\varphi(\bullet)$, $L_t$ may be further smoothed as follows:

$$L_t' \stackrel{\scriptscriptstyle\triangle}{=} \alpha L_{t-1} + (1-\alpha) L_t.$$

Here, $\alpha \in [0, 1]$ is the same smoothing hyperparameter which was used to smooth $\varphi(\bullet)$ and $L_{t=0} \stackrel{\scriptscriptstyle\triangle}{=} \overline{L}$.

Experimental Results

Datasets

The present summarizer was evaluated based on the Document Understanding Conferences (DUC) 2005, 2006 and 2007 benchmarks (See http://www-nlpir.nist.gov/projects/duc/data.html, last viewed Oct. 21, 2018). Given a topic statement, which is expressed by one or more questions, and a set of English documents, the main task is to produce a 250-word (i.e., $L_{max}=250$) topic-focused summary. The number of topics per benchmark are 50, 50, and 45 in the DUC 2005, 2006 and 2007 benchmarks, respectively. The number of documents to be summarized per topic is 32, 25, and 25 in the DUC 2005, 2006 and 2007 benchmarks, respectively. Each document was pre-segmented into sentences. The Lucene's English analysis was used for processing the text of topics and documents (see https://lucene.apache.org, last viewed Oct. 21, 2018.)

The evaluation included the basic (denoted Dual-Step) and adaptive-length (denoted Dual-Step-A) variants of the present summarizer. To this end, on the first saliency-driven step, for Dual-Step, the (strict) upper bound limit on summary length was fixed to $\overline{L}=1500$. Dual-Step-A, on the other hand, adaptively adjusts such length limit and was initialized with $L_{t=0}=3000$. Both variants were further set with a summary limit $L_{max}=250$ for their second focus-driven respective steps.

Both Dual-Step and Dual-Step-A were implemented in Java (JRE8). To reduce the CE method runtime, a preliminary step of sentence pruning was applied, where only the top-150 sentences $s \in D$ with the highest Bhattacharyya similarity to the topic's queries were considered for summarization. The CE-method hyperparameters were fixed as follows: N=10,000, ρ=0.01 and α=0.7.

Finally, to handle the benchmarks' complex information needs, for each summarized topic, the query-focused predictions were calculated (i.e., $\hat{Q}_{qf}(\bullet|q, D)$ and $\hat{Q}_{sim}(\bullet|q, D)$) per each one of its questions. To this end, each question was represented as a sub-query by concatenating the main topic's text to its own text, and was further expanded with top-100 Wikipedia related-words. The topic query-sensitive predictions were then obtained by summing up its various sub-queries' predictions.

The three DUC benchmarks include four reference (ground-truth) human-written summaries per each topic. Summarization quality was recorded using the ROUGE measure. To this end, the ROUGE 1.5.5 toolkit was used with its standard parameters setting. Both Recall and F-Measure are reported for ROUGE-1, ROUGE-2 and ROUGE-SU4. ROUGE-1 and ROUGE-2 measure the overlap in unigrams and bigrams between the produced and the reference summaries, respectively. ROUGE-SU4 measures the overlap in skip-grams separated by up to four words. Finally, since Dual-Step essentially depends on the CE method which has a stochastic nature, its quality may depend on the specific seed that was used for random sampling. Hence, to reduce sensitivity to random seed selection, per each summarization task (i.e., topic and documents pair), each Dual-Step variant was run 30 times (each time with a different random seed) and recorded its mean performance (and 95% confidence interval).

Baselines

The summary quality of Dual-Step was compared to the results that were previously reported for several competitive summarization baselines. These baselines include both supervised and unsupervised methods and apply various strategies for handling the saliency versus focus tradeoff. To distinguish between both types of works, supervised method names are marked with a superscript §.

The first line of baselines utilize various surface and graph level features, including:

BI-PLSA (see, e.g., Shen, C.; Li, T.; and Ding, C. H. Q. 2011. "Integrating clustering and multi-document summarization by bi-mixture probabilistic latent semantic analysis (PSLA) with sentence bases." In Proceedings of the Twenty-Fifth AAAI Conference on Artificial Intelligence, AAAI' 11, 914-920. AAAI Press.)

CTSUM (see, e.g., Wan, X., and Zhang, J. 2014. "Ctsum: Extracting more certain summaries for news articles." In Proceedings of the 37th International ACM SIGIR Conference on Research & Development in Information Retrieval, SIGIR '14, 787-796. New York, N.Y., USA: ACM.)

HierSum (see, e.g., Haghighi, A., and Vanderwende, L. 2009. "Exploring content models for multi-document summarization." In Proceedings of the 2009 Annual Conference of the North American Chapter of the Association for Computational Linguistics, NAACL '09, 362-370. Stroudsburg, Pa., USA: Association for Computational Linguistics.

HybHSum[§] (see, e.g., Celikyilmaz, A., and Hakkani-Tur, D. 2010. "A hybrid hierarchical model for multi-document summarization. In Proceedings of the 48th Annual Meeting of the Association for Computational Linguistics, "ACL '10, 815-824. Stroudsburg, Pa., USA: Association for Computational Linguistics.)

MultiMR (see, e.g., Wan, X., and Xiao, J. 2009. "Graph-based multi-modality learning for topic-focused multi-document summarization." In Proceedings of the 21st International Jont Conference on Artificial Intelligence, IJCAI'09, 1586-1591. San Francisco, Calif., USA: Morgan Kaufmann Publishers Inc.)

QODE (see, e.g., Zhong, S.-h.; Liu, Y.; Li, B.; and Long, J. 2015. "Query oriented unsupervised multi-document summarization via deep learning model." Expert Syst. Appl. 42(21):8146-8155.)

SubMod-F[§] (see, e.g., Lin, H., and Bilmes, J. 2011. "A class of submodular functions for document summarization." In Proceedings of the 49th Annual Meeting of the Association for Computational Linguistics: Human Language Technologies—Volume 1, HLT '11, 510-520. Stroudsburg, Pa., USA: Association for Computational Linguistics.)

The second line of baselines apply various sparse-coding or auto-encoding techniques, including:

DocRebuild (see, e.g., Ma, S.; Deng, Z.-H.; and Yang, Y. 2016. "An unsupervised multi-document summarization framework based on neural document model." In Proceedings of the 26th International Conference on Computational Linguistics: Technical Papers, 1514-1523. Osaka, Japan: The COLING 2016 Organizing Committee.)

RA-MDS (see, e.g., Li, P.; Bing, L.; Lam, W.; Li, H.; and Liao, Y. 2015. "Reader-aware multi-document summarization via sparse coding." In Proceedings of the 24th International Conference on Artificial Intelligence, IJCAI'15, 1270-1276. AAAI Press.)

SpOpt (see, e.g., Yao, J.-g.; Wan, X.; and Xiao, J. 2015. "Compressive document summarization via sparse optimization." In Proceedings of the 24th International Conference on Artificial Intelligence, IJCAI'15, 1376-1382. AAAI Press.)

VAEs-A (see, e.g., Li, P.; Wang, Z.; Lam, W.; Ren, Z.; and Bing, L. "Salience estimation via variational auto-encoders for multi-document summarization." In AAAI, 3497-3503.)

The third line of baselines incorporate various attention models, including:

AttSum[§] (see, e.g., Cao, Z.; Li, W.; Li, S.; Wei, F.; and Li, Y. 2016. "Attsum: Joint learning of focusing and summarization with neural attention." Proceedings of COLING 2016, the 26th International Conference on Computational Linguistics: Technical Papers, pages 547-556, Osaka, Japan, Dec. 11-17 2016).

C-Attention (see, e.g., Li, P.; Lam, W.; Bing, L.; Guo, W.; and Li, H. "Cascaded attention based unsupervised information distillation for compressive summarization." In Proceedings of the 2017 Conference on Empirical Methods in Natural Language Processing, 2081-2090.)

CRSum+SF[§] (see, e.g., Ren, P.; Chen, Z.; Ren, Z.; Wei, F.; Ma, J.; and de Rijke, M. "Leveraging contextual sentence relations for extractive summarization using a neural attention model." In Proceedings of the 40th International ACM SIGIR Conference on Research and Development in Information Retrieval, SIGIR '17, 95-104. New York, N.Y., USA: ACM.)

It should be noted that, some baselines, like DocRebuild, SpOpt and C-Attention, use hand-crafted rules for sentence compression.

Finally, the present summarizer variants were also directly compared with two CES variants. The first one is the original CES summarizer, whose results are reported in (Feigenblat et al. 2017). The second one, denoted hereinafter CES[+], utilizes six quality predictors which are combined within a single optimizing objective. This variant, therefore, allows to directly evaluate the contribution of the present dual-cascade learning approach which is employed by the two Dual-Step variants.

Results

The main results of the evaluation are reported in Table 1 (ROUGE-X F-Measure) and Table 2 (ROUGE-X Recall) below. The numbers reported for the various baselines are the best numbers reported in their respective works. Unfortunately, not all baselines fully reported their results for all benchmarks and measures. Whenever a report on a measure is missing, the cell entry is the symbol '-'.

TABLE 1

Results of ROUGE F-Measure evaluation on DUC 2005, 2006, and 2007 benchmarks.

| Benchmark | System | R-1 | R-2 | R-SU4 |
|---|---|---|---|---|
| DUC 2005 | MultiMR | 36.90 | 6.83 | — |
| | CES | 37.76(±.03) | 7.45(±.03) | 13.02(±.02) |
| | CES[+] | 36.94(±.01) | 7.21(±.04) | 12.82(±.04) |
| | Dual-Step-A | 38.13(±.07) | 7.58(±.04) | 13.24(±.04) |
| | Dual-Step | 38.08(±.06) | 7.54(±.03) | 13.17(±.03) |
| DUC 2006 | RA-MDS | 39.10 | 8.10 | 13.6 |
| | MultiMR | 40.30 | 8.50 | — |
| | DocRebuild | 40.86 | 8.48 | 14.45 |
| | C-Attention | 39.30 | 8.70 | 14.10 |
| | VAEs-A | 39.60 | 8.90 | 14.30 |
| | CES | 40.46(±.02) | 9.13(±.01) | 14.71(±.01) |
| | CES[+] | 39.93(±.08) | 9.02(±.05) | 14.42(±.05) |
| | Dual-Step-A | 41.07(±.07) | 9.42(±.06) | 14.89(±.05) |
| | Dual-Step | 41.23(±.07) | 9.47(±.04) | 14.97(±.03) |
| DUC 2007 | RA-MDS | 40.80 | 9.70 | 15.00 |
| | MultiMR | 42.04 | 10.30 | — |
| | DocRebuild | 42.72 | 10.30 | 15.81 |
| | CTSUM | 42.66 | 10.83 | 16.16 |
| | C-Attention | 42.30 | 10.70 | 16.10 |
| | VAEs-A | 42.10 | 11.10 | 16.40 |
| | CES | 42.84(±.01) | 11.33(±.01) | 16.50(±.01) |
| | CES[+] | 41.90(±.08) | 11.14(±.06) | 16.17(±.05) |
| | Dual-Step-A | 43.25(±.06) | 11.73(±.06) | 16.80(±.04) |
| | Dual-Step | 43.24(±.07) | 11.78(±.05) | 16.83(±.05) |

TABLE 2

Results of ROUGE Recall evaluation on
DUC 2005, 2006, and 2007 benchmarks.

| Benchmark | System | R-1 | R-2 | R-SU4 |
|---|---|---|---|---|
| DUC 2005 | SubMod-F[§] | — | 8.38 | — |
| | CRSum-F[§] | 39.52 | 8.41 | — |
| | BI-PLSA | 36.02 | 6.76 | — |
| | CES | 43.33(±.03) | 7.94(±.02) | 13.89(±.02) |
| | CES[+] | 39.56(±.11) | 7.71(±.04) | 13.73(±.04) |
| | Dual-Step-A | 40.85(±.07) | 8.1(±.04) | 14.19(±.04) |
| | Dual-Step | 40.82(±.06) | 8.07(±.03) | 14.13(±.04) |
| DUC 2006 | AttSum[§] | 40.90 | 9.40 | — |
| | SubMod-F[§] | — | 9.75 | — |
| | HybHSum[§] | 43.00 | 9.10 | 15.10 |
| | CRSum + SF[§] | 41.70 | 10.03 | — |
| | HierSUm | 40.10 | 8.60 | 14.30 |
| | SpOpt | 39.96 | 8.68 | 14.22 |
| | QODE | 40.15 | 9.28 | 14.79 |
| | CES | 43.00(±.01) | 9.69(±.01) | 15.63(±.01) |
| | CES[+] | 42.57(±.09) | 9.61(±.06) | 15.38(±.06) |
| | Dual-Step-A | 43.78(±.07) | 10.04(±.06) | 15.88(±.05) |
| | Dual-Step | 43.94(±.07) | 10.09(±.05) | 15.96(±.03) |
| DUC 2007 | AttSum[§] | 43.92 | 11.55 | — |
| | SubMod-F[§] | — | 12.38 | — |
| | HybHSum[§] | 45.60 | 11.40 | 17.20 |
| | CRSum + SF[§] | 44.60 | 12.48 | — |
| | HierSUm | 42.40 | 11.80 | 16.70 |
| | SpOpt | 42.36 | 11.1 | 16.47 |
| | QODE | 42.95 | 11.63 | 16.85 |
| | CES | 45.43(±.01) | 12.02(±.01) | 17.50(±.01) |
| | CES[+] | 44.65(±.01) | 11.85(±.01) | 17.21(±.06) |
| | Dual-Step-A | 46.01(±.07) | 12.47(±.06) | 17.87(±.04) |
| | Dual-Step | 46.02(±.08) | 12.53(±.06) | 19.91(±.05) |

First, among the various baseline methods, CES on its own serves as the strongest baseline to outperform in most cases. Overall, Dual-Step provides better results compared to any other baseline (and specifically the unsupervised ones). Specifically, on F-Measure, Dual-Step has achieved between 6%-14% and 1%-3% better ROUGE-2 and ROUGE-1, respectively. On recall, Dual-Step has achieved between 3%-9% better ROUGE-1. On ROUGE-2, in the DUC 2006 and 2007 benchmarks, Dual-Step was about 1%-9% better, while it was slightly inferior to SubMod-F and CRSum+SF in the DUC 2005 benchmark. Yet, Sub-Mod-F and CRSum+SF are actually supervised, while Dual-Step is fully unsupervised. Therefore, overall, Dual-Step's ability to reach and even to outperform the quality of strong supervised counterparts actually only emphasizes its potential.

Dual-CES Variants vs. CES Variants

Dual-Step significantly improves over the two CES variants in all benchmarks. On F-Measure, Dual-Step has achieved at least between 4%-5% and 1%-2% better ROUGE-2 and ROUGE-1, respectively. On recall, Dual-Step has achieved at least between 2%-4% and 1%-2% better ROUGE-2 and ROUGE-1, respectively. By distilling saliency-based pseudo-feedback between step transitions, Dual-Step manages to better utilize the CE method for selecting a more promising subset of sentences. A case in point is the CES[+] variant which is even inferior to CES. This shows that a simple combination of all predictors (except Predictor 7 which is unique to Dual-Step since it requires a pseudo-reference summary) does not directly translates to a better tradeoff handling. This, therefore, serves as a strong empirical evidence on the importance of the dual-cascade optimization approach implemented by Dual-Step, which allows to produce focused summarizes with better saliency.

Dual-CES Variants vs. Attentive Baselines

Dual-Step also significantly improves over any attentive baselines on ROUGE-1. On ROUGE-2, Dual-Step is significantly better than C-Attention and AttSum, while it provides similar quality to CRSum+SF. Closer analysis of the various attention strategies that are employed within these baselines reveals that, while AttSum only attends on a sentence representation level, C-Attention and CRSum+SF further attend on a word level. A more fine-granular attendance typically results in an improved saliency for the two latter models. Yet, although C-Attention first attends on sentences then on words, CRSum+SF performs its attentions reversely. In a sense, similar to CRSum+SF, Dual-Step also first "attends" on salient words which are distilled from the pseudo-feedback reference summary. Dual-Step then utilizes such salient words for better selection of salient sentences within its second step of focused summary production. Yet, compared to CRSum+SF and similar to C-Attention, Dual-Step's saliency 'attention' process is unsupervised. Moreover, Dual-Step further 'attends' on salient sentence positions, which result in better tuning of the position-bias b hyperparameter.

Hyperparameter $\overline{L}$ Sensitivity Analysis

Figure 5:
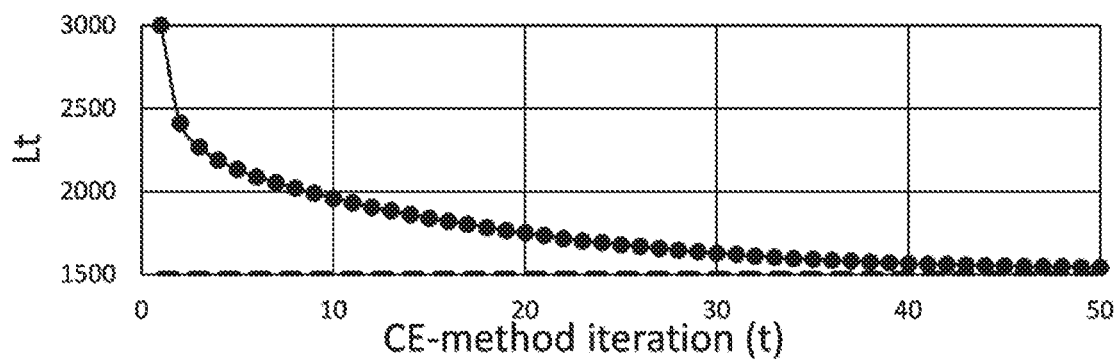
FIG. 5 illustrates adaptive-length learning, according to an embodiment.

Table 3 reports below the sensitivity of Dual-Step (measured by ROUGE-X Recall) to the value of hyperparameter $\overline{L}$, using the DUC 2007 benchmark. To this end, Dual-Step was ran with an increasing $\overline{L}$ value. For further comparison, table 3 also reports the results of the adaptive-length version Dual-Step-A. Dual-Step-A is still initialized with $L_{t=0}=3000$ and adaptively adjusts this hyperparameter. FIG. 5 illustrates the (average) learning curve of the adaptive-length parameter $L_t$.

Overall, Dual-Step's summarization quality remains quite stable, exhibiting low sensitivity to $\overline{L}$. Similar stability was further observed for the two other DUC benchmarks. In addition, FIG. 5 also depicts an interesting empirical outcome: Dual-Step-A converges (more or less) to the best hyperparameter $\overline{L}$ value (i.e., $\overline{L}$=1500 in Table 3). Dual-Step-A, therefore, serves as a robust alternative for flexibly estimating such hyperparameter value during runtime. Dual-Step-A can provide similar quality and may outperform Dual-Step.

TABLE 3

Sensitivity of Dual-Step to the value of
hyperparameter $\overline{L}$ (DUC 2007 benchmark)

| $\overline{L}$ | R-1 | R-2 | R-SU4 |
|---|---|---|---|
| 500 | 45.52 | 12.32 | 17.69 |
| 750 | 45.84 | 12.46 | 17.85 |
| 1000 | 45.88 | 12.48 | 17.84 |
| 1250 | 45.91 | 12.50 | 17.86 |
| 1500 | 46.02 | 12.53 | 17.91 |
| 1750 | 45.99 | 12.46 | 17.87 |
| 2000 | 45.97 | 12.44 | 17.83 |
| Adaptive-length ($L_t$) | 46.01 | 12.47 | 17.87 |

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire. Rather, the computer readable storage medium is a non-transient (i.e., not-volatile) medium.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A system comprising:
at least one hardware processor; and
a non-transitory computer-readable storage medium having stored thereon program instructions, the program instructions executable by the at least one hardware processor to:
receive, as input, one or more digital documents, a query statement, and a summary length constraint,
automatically generate, for each of said one or more digital documents, an initial summary based, at least in part, on a first sentence selection which satisfies said query statement, a modified said summary length constraint, and a first summary quality goal,
automatically extract, from each of said initial summaries, one or more associated feedback metrics, and
automatically generate, for each of said one or more digital documents, a final summary based, at least in part, on:
(i) a second sentence selection which satisfies said query statement, said summary length constraint, and a second summary quality goal, and
(ii) at least one of said associated feedback metrics,
wherein said first summary quality goal is summary saliency, and said second summary quality goal is summary focus.

2. The system of claim 1, wherein said one or more associated feedback metrics are selected from the group consisting of: frequency of unique textual aspects, distribution of unique textual aspects, patterns of unique textual aspects, relative start-positions of sentences, maximum sentence length, minimum sentence length, average sentence length, maximum number of words in each sentence, minimum number of words in each sentence, and average number of words in each sentence.

3. The system of claim 2, wherein said unique textual aspects comprise at least one of n-grams, entities, and concepts.

4. The system of claim 1, wherein said summary length constraint is expressed as number of words.

5. The system of claim 1, wherein said modified summary length constraint is longer than said summary length constraint.

6. The system of claim 1, wherein said first summary quality goal comprises one or more quality goals selected from the group consisting of: document coverage, sentence position bias, summary length, asymmetric coverage, and focus drift.

7. The system of claim 1, wherein said second summary quality goal comprises a query-relevancy quality goal.

8. The system of claim 1, wherein said first and second sentence selections are each based, at least in part, on solving an optimization problem using one or more specified optimization frameworks.

9. The system of claim 8, wherein said optimization framework is a cross-entropy framework.

10. The system of claim 1, wherein said modified summary length constraint is an adaptive summary length constraint, based, at least in part, on importance sampling.

11. A method comprising:
operating at least one hardware processor for:
receiving, as input, one or more digital documents, a query statement, and a summary length constraint,
automatically generating, for each of said one or more digital documents, an initial summary based, at least in part, on a first sentence selection which satisfies said query statement, a modified said summary length constraint, and a first summary quality goal,
automatically extracting, from each of said initial summaries, one or more associated feedback metrics, and
automatically generating, for each of said one or more digital documents, a final summary based, at least in part, on:
(iii) a second sentence selection which satisfies said query statement, said summary length constraint, and a second summary quality goal, and
(iv) at least one of said associated feedback metrics,
wherein said first summary quality goal is summary saliency, and said second summary quality goal is summary focus.

12. The method of claim 11, wherein said one or more associated feedback metrics are selected from the group consisting of: frequency of unique textual aspects, distribution of unique textual aspects, patterns of unique textual aspects, relative start-positions of sentences, maximum sentence length, minimum sentence length, average sentence length, maximum number of words in each sentence, minimum number of words in each sentence, and average number of words in each sentence.

13. The method of claim 12, wherein said unique textual aspects comprise at least one of n-grams, entities, and concepts.

14. The method of claim 11, wherein said summary length constraint is expressed as number of words.

15. The method of claim 11, wherein said modified summary length constraint is longer than said summary length constraint.

16. The method of claim 11, wherein said first summary quality goal comprises one or more quality goals selected from the group consisting of: document coverage, sentence position bias, summary length, asymmetric coverage, and focus drift.

17. The method of claim 11, wherein said second summary quality goal comprises a query-relevancy quality goal.

18. The method of claim 11, wherein said first and second sentence selections are each based, at least in part, on solving an optimization problem using one or more specified optimization frameworks.

* * * * *